No. 886,041. PATENTED APR. 28, 1908.
J. C. DAWSON.
COAT HANGER.
APPLICATION FILED FEB. 21, 1907.

Witnesses:
W. H. Cotton
E. M. Klatcher

Inventor:
James C. Dawson
By Louis K. Gieeson, Atty.

UNITED STATES PATENT OFFICE.

JAMES C. DAWSON, OF ST. LOUIS, MISSOURI.

COAT-HANGER.

No. 886,041.　　　Specification of Letters Patent.　　　Patented April 28, 1908.

Application filed February 21, 1907. Serial No. 358,598.

*To all whom it may concern:*

Be it known that I, JAMES C. DAWSON, a citizen of the United States, and resident of the city of St. Louis, State of Missouri, have invented certain new and useful Improvements in Coat-Hangers, of which the following is a specification, and which are illustrated in the accompanying drawings, forming a part thereof.

This invention relates to folding coat hangers, its object being to simplify and render exceedingly compact devices of this character whereby they may be folded to very small form for convenience of transportation, and will easily lengthen out sufficiently to hold a garment.

The invention consists of the device illustrated in the accompanying drawings, in which—

Figure 1:
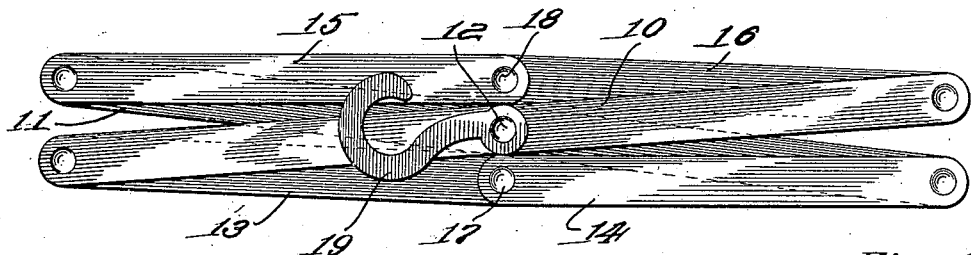
Figure 2:
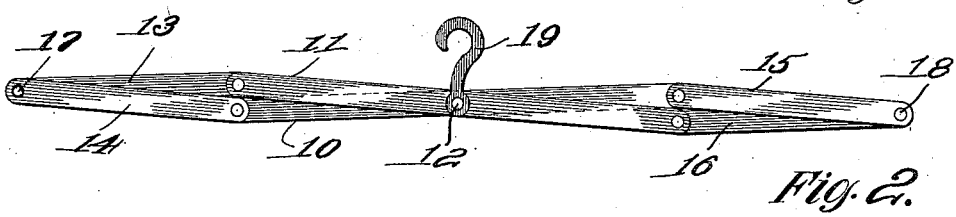
Figure 3:
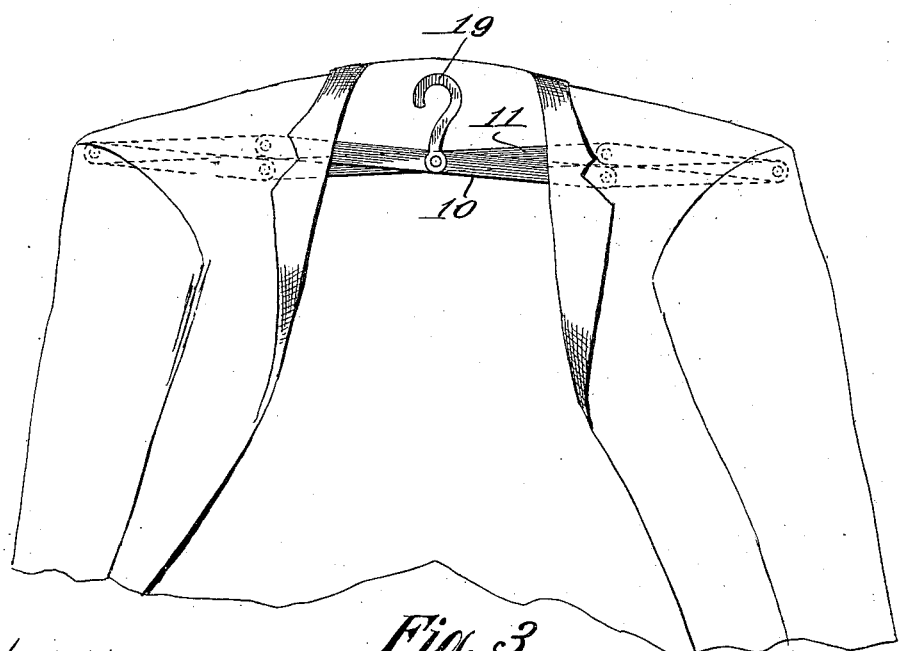

Figure 1 is a view of the hanger when folded; Fig. 2 is a view of the same when extended; and Fig. 3 is a view the same as Fig. 2, the hanger being shown in service.

The hanger is constructed of a series of jointed levers and links, in the manner usually known as the lazy tong. It may consist of as many elements as may be desired to secure the requisite length, as shown there is a single pair of levers 10, 11, pivotally united midway of their ends, as shown at 12.

To each end of each lever is pivotally attached a link, shown at 13, 14, 15 and 16, the outer ends of the members of each pair of links, as 13, 14 and 15, 16 being pivotally united, as shown at 17, 18. The length of these links is slightly more than the length of each of the levers 10, 11, in order that their ends may overlap for receiving their pivots when the device is folded and they are brought into alinement, as shown in Fig. 1. A hook 19 is secured upon the central pivot 12.

The device is extended by seizing one or both members of each pair of links and drawing the two pairs apart, thereby flexing all of the joints. When extended the crossed levers 10, 11 are brought as nearly parallel as is possible in view of the presence of the links attached to their ends, thus uncovering the eye of the hook 19 and making it available for its intended function of engaging a suitable support.

The device is readily folded by seizing adjacent ends of the levers 10, 11, and separating them.

I claim as my invention—

A folding coat hanger comprising, in combination a set of lazy tongs, and a hook attached to the pivot uniting the members of a pair of crossed levers of the lazy tongs.

JAMES C. DAWSON.

Witnesses:
　W. S. OLIVER,
　M. E. YOUNGER.